(12) United States Patent
Schmatz

(10) Patent No.: US 6,497,413 B1
(45) Date of Patent: Dec. 24, 2002

(54) METHOD FOR PRODUCING A SEALING BETWEEN TWO ENGINE PARTS, ESPECIALLY BETWEEN AN ENGINE BLOCK AND A CYLINDER HEAD

(75) Inventor: Thomas M. Schmatz, Munich (DE)

(73) Assignee: Henkel Loctite Deutschland GmbH, München (DE)

( * ) Notice: Subject to any disclaimer, the term of this patent is extended or adjusted under 35 U.S.C. 154(b) by 0 days.

(21) Appl. No.: 09/743,221

(22) PCT Filed: Jul. 21, 1999

(86) PCT No.: PCT/EP99/05211
§ 371 (c)(1),
(2), (4) Date: Jan. 8, 2001

(87) PCT Pub. No.: WO00/05522
PCT Pub. Date: Feb. 3, 2000

(30) Foreign Application Priority Data

Jul. 21, 1998 (DE) .......................... 198 32 788

(51) Int. Cl.[7] .............................. F02F 11/00
(52) U.S. Cl. ............ 277/313; 277/312; 277/314; 277/316; 277/591; 277/592; 277/602; 277/608; 277/627
(58) Field of Search ................. 277/313, 314, 277/316, 591, 592, 598, 602, 608, 609, 627

(56) References Cited

U.S. PATENT DOCUMENTS

| | | | | |
|---|---|---|---|---|
| 3,869,132 A | * | 3/1975 | Taylor et al. | |
| 4,659,410 A | * | 4/1987 | McDowell et al. | |
| 4,772,031 A | * | 9/1988 | Poppo | |
| 4,950,521 A | * | 8/1990 | Takamura et al. | |
| 5,267,740 A | * | 12/1993 | Stritzke | |
| 5,275,420 A | * | 1/1994 | Rodenkirch | |
| 5,716,051 A | * | 2/1998 | Cornea et al. | |
| 5,727,791 A | | 3/1998 | Weiss et al. | |
| 5,955,020 A | * | 9/1999 | Gholson | |
| 6,186,506 B1 | * | 2/2001 | Kionoshita | |

FOREIGN PATENT DOCUMENTS

| | | | |
|---|---|---|---|
| GB | 2041492 | 9/1980 | ............ F16J/11/04 |
| GB | 2189253 | 10/1987 | ............ C09K/3/10 |

* cited by examiner

*Primary Examiner*—Anthony Knight
*Assistant Examiner*—Christopher Boswell
(74) *Attorney, Agent, or Firm*—Steven C. Bauman

(57) ABSTRACT

For manufacturing a seal between two machine parts (10, 11) which together enclose a space (14) in which, at least at times, high pressure and/or high temperature prevail, sealing means which contain a curable composition (30) are arranged between the two machine parts (10, 11). The curable composition (30) is applied directly onto one or both machine parts (10, 11) in liquid form at least in the area which does not directly adjoin the space (14) in which, at least at times, high temperature and/or high pressure prevails. The two machine parts are built in before the curing of composition (30). A sealing ring can be inserted between the two machine parts (10, 11) directly around the edge of the high pressure and high temperature space (14) or that edge can be slightly raised and the curable composition (30) can be used for sealing outside this area. The sealing ring can lie in a recess of a seal surface (12) of the peripheral wall of the chamber (14), the recess being dimensioned so that the pressure required for the seal is exerted on the sealing ring in the assembled state of the two machine parts (10, 11). The two machine parts can be the elngine block (10) and the cylinder head (11) of a piston engine.

12 Claims, 2 Drawing Sheets

METHOD FOR PRODUCING A SEALING BETWEEN TWO ENGINE PARTS, ESPECIALLY BETWEEN AN ENGINE BLOCK AND A CYLINDER HEAD

BACKGROUND OF THE INVENTION

The invention relates to a process for manufacturing a seal between two machine parts which together enclose a space in which, at least at times, high pressure and/or high temperature prevail. A curable composition is applied as a sealing means directly onto one or both machine parts at least in the areas which do not directly adjoin the space in which, at least at times, high pressure and/or high temperature prevails, and the two machine parts are built in before the curing of the composition.

The invention relates further to an arrangement of two machine parts connected to each other with a seal therebetween, as well as a piston engine with an engine block and a cylinder head and with a seal arranged therebetween.

A solid seal is usually inserted between the engine block and the cylinder head to seal the cylinder head. The solid seal covers the entire seal surface between the engine block and the cylinder head. Openings in the cylinder head seal are provided in the area of the combustion chambers, the cooling water ducts, the cylinder head screws, etc. The edges of the openings for the combustion chambers are strengthened by metal inserts. The other openings can have rings of silicon beads to ensure sealing at these points. The costs of complicated cylinder head seals as used today to achieve quality standards bear no relation to other sealing solutions.

There is known from GB-A-2 189 253 a process of the type quoted at the outset wherein only one curable composition, which is non-fluid at rest, is used as sealing means.

It is known from DE-A-2 203 485 to form a sealing ring in situ between two flanges by introducing between the flanges a solid, moldable, polyacrylate polymer seal means which is heat curable to an elastomer, the flanges then being pressed onto each other in order to achieve a complete contact between the seal means and the seal surfaces of the flanges, and by finally heating the arrangement in order to convert the seal means to the elastomeric form.

There is known from U.S. Pat. No. 5,116,558 and DE-A-196 32 275 a sealing and bonding method for connecting component parts, especially a method for sealing and bonding metal component parts in the vehicle and engine technology. At least one groove with a filling opening is provided in at least one of the joint surfaces. The component parts are joined together in the desired orientation and a sealing or bonding composition is then filled in through the filling opening until the groove is completely filled.

An elastomeric silicone seal is known from DE-A-44 39 186, the silicone being applied to the housing cover in uncrosslinked state and a predetermined period then being allowed to pass up to partial crosslinking of the silicone before it being brought into the desired shape by means of a punching tool. The silicone is subsequently allowed to crosslink completely.

It is known from DE-C1-37 40 033 to provide a flowable sealing means at the solid, cylinder head, seal end side facing toward the timing case cover. The sealing means is pressed during assembly against the seal step sections of a profile seal which is provided between the cylinder head side and the crankcase side cover part of the timing case cover.

Further, it is known to use curable composition appliable in liquid form for sealing gearbox housing covers and oil sump covers. However, only relatively low temperatures and low pressures occur inside such covers.

The object of the invention is to simplify the manufacture of a seal between two machine parts which enclose a space in which relatively high pressures and/or temperatures prevail.

According to the invention, this object is achieved in that the curable composition is applied in liquid form directly onto one or both machine parts, in that directly around the edge of the high pressure and/or high temperature space, a sealing ring is inserted between the two machine parts into a recess of a seal surface of the peripheral wall of the chamber, the recess being dimensioned so that the pressure required for the seal is exerted on the sealing ring in the assembled state of the two machine parts, and in that the curable composition is used for sealing outside the areas which directly adjoin the space.

According to the invention, the solid seal is thus at least partially replaced by a chemical liquid seal.

Subject matter of the invention is further an arrangement of two machine parts connected to each other with a seal there-between, the seal being produced according to the process of the invention, as well as a piston engine with an engine block and a cylinder head and with a seal arranged therebetween, the seal being formed by a curable composition at least in the areas which do not directly adjoin the combustion chambers.

Because the curable composition is built in before the curing, it is a so-called FIP (=formed in place) product. As opposed to that, a so-called CIP (=cured in place) product would not be built in until after curing.

The curable composition is applied directly onto the seal is surface of one or both machine parts. The application of the curable composition can be totally automated, which results in savings not only due to the absence of the solid seal but also is approx. 300 MPa, there is no such maximum value for the seal according to the invention. Within the compressive strength of the material of the machine parts concerned, the surface pressure can be as high as required.

In the case of larger flanges and therewith larger flange surfaces, in particular with multicylinder engines, relative movements of the two seal surfaces can come about due to the different heating or a different thermal expansion coefficient of the component parts. A destruction of the sealing means and a leakage involved with that can be prevented here by a thicker sealant film by which the sealant can follow this movement. In order also to guarantee a metal-on-metal contact in such a case, a bevel or recess is provided at the inner or outer edges of the sealing surface. The thicker sealant film can also be achieved in the area of this bevel or recess when there is otherwise substantially metal-on-metal contact. The beveling or recessing is as a rule merely to be carried out on one flange side, a sufficient covering of the two flange surfaces having to be heeded. A sealant film can build up in the area of the bevel or recess. The thickness of the seal film is to be designed in accordance with the elasticity of the sealant used and the existing relative movement of the flange surfaces to each other so that the sealant is not destroyed during the whole service life of the assembly group. As a rule, a minimum layer thickness of 0.8 mm is sufficient. Depending on the case of application, the bevel or recess can extend over the whole area or also only over part areas of the flange. It may also be necessary for specific applications on the basis of the geometric circumstances of the flange surface to arrange a groove or groove/slant instead of the bevel or recess. The bevel, recess, groove or groove/slant can already be introduced into the casting to save costs.

Due to the described geometric changes in the flange (bevel, recess, groove, groove/slant), an escape of the excess sealant internally or externally is avoided upon correct dimensioning as well as a sufficiently exact metering of the sealant. A sealant escape, e.g., into the combustion chamber can, consequently, be avoided. With an uncontrolled sealant escape, it can come to damage to the assembly group or subsequent assemblies during operation.

The curable composition is preferably an adhesive on an acrylic or silicone basis, e.g. Loctite 5920, Loctite 5699 or 5999, Loctite 5900 or Loctite 5970. However, other chemical compositions are also conceivable. A curable composition or such a sealant is preferably used which is applicable at temperatures of above 180 EC.

The process according to the invention is particularly suitable for manufacturing a seal between the engine block and the cylinder head of a combustion engine, but is also suitable for the manufacture of flange seals in gas turbines and similar machines.

Embodiments of the invention are explained below with the help of the drawing. There are shown:

BRIEF DESCRIPTION OF THE FIGURES

FIG. 1 shows an engine block 10 from above so that only its seal surface 12 is visible. There are openings in the seal surface 12 for the combustion chambers 14, the cooling water ducts 16, the oil bores 18, the chamber 20 for the timing chain and the cylinder head screws 22. Beads 30 of a curable composition are applied around all of these openings. The amount applied is controlled so that a very thin layer of adhesive or composition forms after the fitting of the cylinder head and the tightening of the cylinder head screws and there is virtually a metal-on-metal contact between the engine block 10 and the cylinder head. The heat transmission between these two machine parts and the heat dissipation are thereby improved.

The cylinder head is fitted and the cylinder head screws are tightened so that a surface pressure of at least 2.5 MPa is ensured during operation in the areas of the seal surface adjoining the combustion chambers 14. In the other areas of the seal surface 12, the surface pressure can also be lower, depending on the choice of curable composition used as a sealing means.

Figure 2:
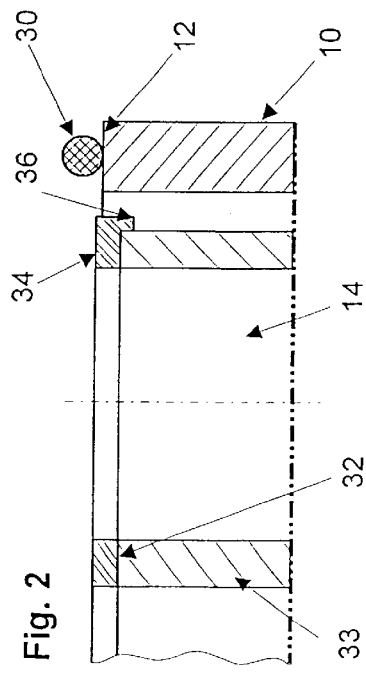
FIG. 2 a detailed section along the cylinder axis in longitudinal engine direction.

FIG. 2 shows an embodiment in which the seal surface 12 in the areas 32 around the combustion chambers 14 is somewhat recessed relative to the other areas. For this, the chamber wall 33 thus has a somewhat lesser height than the rest of the engine block 10. A metal sealing ring 34 is positioned in the recess 32, i.e. on top of the chamber wall 33. Instead of in the engine block 10, a corresponding recess can also be provided in the cylinder head. It is also possible to provide such a recess in both the engine block 10 and in the cylinder head. The recess 32 and the thickness of the sealing ring 34 are matched to each other so that the sealing ring 34 is pressed.

For multicylinder engines, the sealing rings 34 for the individual cylinders can form a continuous chain. The sealing rings 34 can be fixed by adhesive. They can also have a downwardly directed outer edge 36 which covers the outside of the chamber walls 33 and thus prevents a slipping of the sealing rings 34 before assembly.

Beads 30 of the curable composition are applied around the openings for the cooling water ducts 16, the oil bores 18, the chambers 20 for the timing chain and the cylinder head screws 22. The cylinder head screws are tightened with the usual torque.

Figure 3:
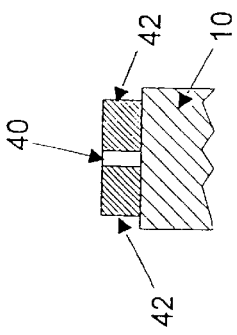
FIG. 3 in section, a sealing ring enclosed on both sides by a plastic ring arranged on the edge of the cylinder bore of an engine block.

In the embodiment shown in FIG. 3, a thin metal ring 40 which is enclosed on the inside and outside by plastic strips is placed around the opening for the combustion chambers 14. When fitting the cylinder head the thin metal ring 40 is pressed into the material of the engine block 10 and cylinder heads, whereby a reliable seal is achieved around the combustion chamber 14.

Figure 1:
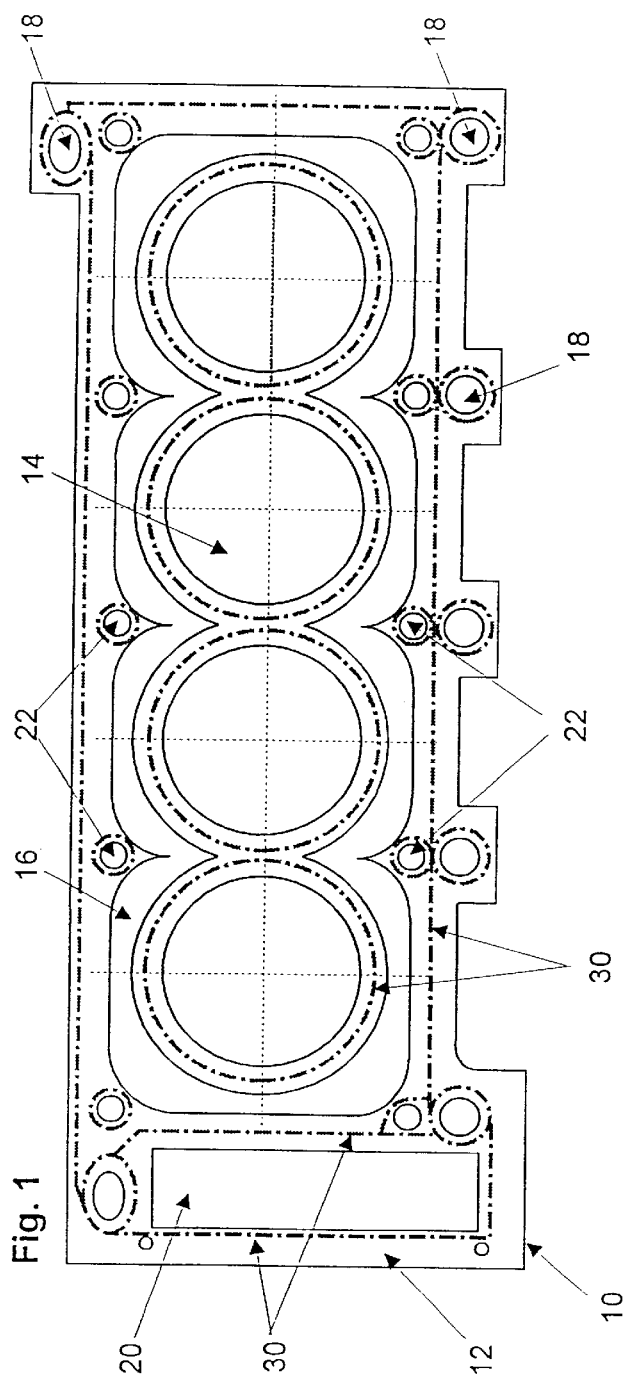
FIG. 1 a top view of an open engine block.
Figure 4:
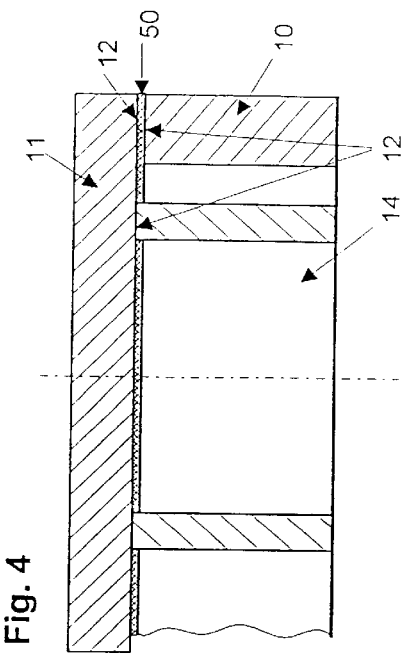
FIG. 4 in section, the seal between the cylinder head and an engine block.

FIG. 4 shows the seal surfaces 12 of the engine block 10 and the cylinder head 11 and a seal 50 therebetween. The seal surfaces 12 edges surrounding the combustion chamber (14) are slightly raised so that there is largely metal-on-metal contact in that area. In the other areas, the seal 50 has a thickness up to 0.8 mm.

Figure 5:
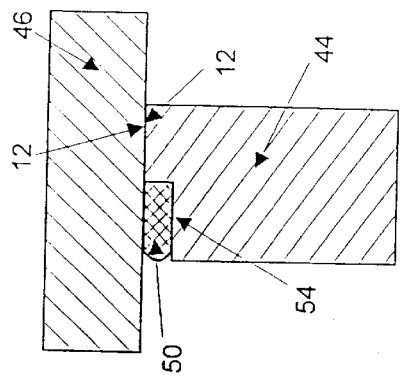
FIGS. 5 to 8 in section, the seal between two machine parts, a bevel, recess, straight groove or, resp., slanted groove is formed in one of the seal surfaces.

FIG. 5 shows two flanges 44, 46 and the seal 50 therebetween. The flanges 44, 46 have the seal surfaces 12. The edges of the seal surfaces 12 have a 30E bevel 48 with a height of 0.8 mm. The bevel 48 forms a wedge-shaped groove in which the curable composition forms a convex meniscus 52. The edge areas of the seal 50 are protected by the bevel 48 in particular against separation from the seal surfaces 12. The seal 50 thereby also withstands relative movements of the flanges 44, 46 as a result of temperature differences or different temperature coefficients.

Figure 6:
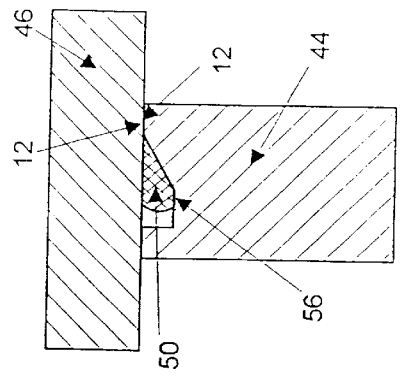

FIG. 6 shows an arrangement similar to that of FIG. 5, a steplike recess 54 having a step height of 0.8 mm is formed in the seal surface 12 of the one flange 44. Due to the greater thickness of the seal 50 within the recess 54, the seal 50 withstands smaller relative movements of the flanges 44, 46.

Figure 7:
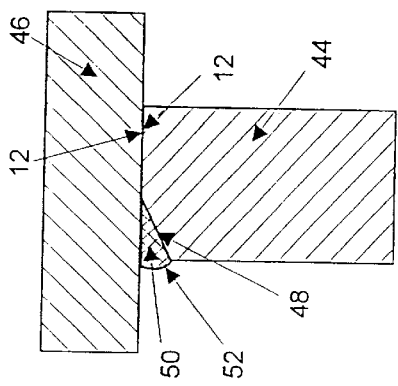
Figure 8:
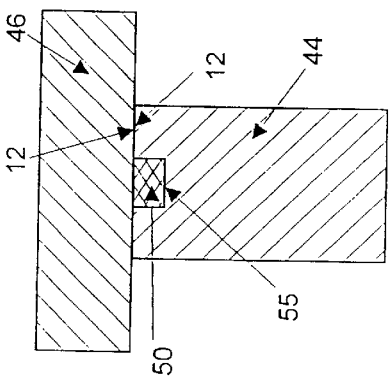

FIGS. 7 and 8 show the two flanges 44, 46 with the seal 50 therebetween, a right-angular or, resp., one-side slanted groove 55, 56 is formed within the seal surface 12 of the flange 44. The grooves 55, 56 have a depth again of 0.8 mm so that the seal 50 here has a corresponding thickness. Also due to such a greater layer thickness in the interior area of the seal surfaces 12, the flanges 44, 46 can be sealed in a manner that the seal 50 withstands high temperatures and/or pressures within the adjoining spaces and relative movements conditioned by temperature.

LIST OF REFERENCE NUMERALS

10 Engine block
11 Cylinder head
12 Seal surface
14 Combustion chamber
16 Cooling water duct
18 Oil bore
20 Chamber for timing chain
22 Cylinder head screws
30 Bead
32 Recess
33 Chamber wall 34 Sealing ring
36 Edge
40 Metal ring
42 Plastic strips
44,46 Flanges
48 Bevel
50 Seal
52 Meniscus
54 Recess
55 Right-Angular groove
56 One-Side slanted groove

What is claimed is:

1. A process for manufacturing a seal between two machine parts which together enclose a space in which, at least at times, high pressure prevail, high temperature prevail, or both the process comprising the steps of:

applying a curable composition in liquid form directly onto one or both machine parts at least in the areas which do not directly adjoin the space in which, at least at times, high pressure prevail, high temperature prevail, or both;

inserting between the two machine parts directly around the edge of the high pressure space, high temperature space or both a sealing ring into a recess of a seal surface of the peripheral wall of the space, the recess being dimensioned so that the pressure required for the seal is exerted on the sealing ring in the assembled state of the two machine parts; and building in the two machine parts before curing of the composition;

wherein once cured the curable composition seals outside the area directly adjoining the space.

2. The process of claim 1, wherein the sealing ring is a metal ring.

3. The process of claim 2, wherein the metal ring is inserted in a plastic ring.

4. The process of claim 2, wherein the metal ring is attached to a plastic ring.

5. The process of claim 1, wherein the curable composition is applied onto the entire seal surface of the two machine parts.

6. The process of claim 1, wherein the two machine parts are the engine block and the cylinder head of a piston engine.

7. An arrangement of two machine parts connected to each other and with a seal therebetween, wherein the seal is produced according to the process of claim 1.

8. An arrangement of two machine parts connected to each other and with a seal therebetween, wherein the seal is produced according to the process of claim 2.

9. An arrangement of two machine parts connected to each other and with a seal therebetween, wherein the seal is produced according to the process of claim 3.

10. An arrangement of two machine parts connected to each other and with a seal therebetween, wherein the seal is produced according to the process of claim 4.

11. An arrangement of two machine parts connected to each other and with a seal therebetween, wherein the seal is produced according to the process of claim 5.

12. A piston engine comprising:

a motor block including a combustion chamber, a cylinder head and a seal arranged therebetween; wherein the seal includes a sealing ring inserted between the engine block and the cylinder head directly around the edge of the combustion chamber into a recess of a seal surface of the peripheral wall of the combustion chamber, the recess being dimensioned so that the pressure required for the seal is exerted on the sealing ring in the assembled state of the motor block and the cylinder head; and wherein the seal is formed by a curable composition at least in the areas which do not directly adjoin the combustion chamber.

* * * * *